2,754,301

2-VINYL-4-ALKANOLPYRIDINES AND PROCESS THEREFOR

Francis E. Cislak, Indianapolis, Ind., assignor to Reilly Tar & Chemical Corporation, Indianapolis, Ind., a corporation of Indiana No Drawing. Application March 5, 1956, Serial No. 569,236

12 Claims. (Cl. 260—297)

My present invention relates to 2-vinyl-4-alkanolpyridines and to the process of making them. More particularly, it relates to 2-vinyl-4-alkanolpyridines having the general formula:

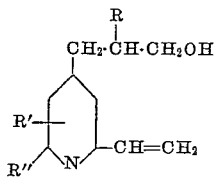

where R, R', and R" represent hydrogen or lower alkyl.

In general the compounds of my invention may be prepared by the dehydration of a 2-(ethan-2-ol)pyridine having as a substituent in the 4-position the group

—CH$_2$·CRH·CH$_2$OH wherein R represents hydrogen or lower alkyl. The dehydration may be accomplished by vaporizing the 2-ethanol-4-alkanolpyridine through a non-acid dehydrating catalyst maintained at a dehydrating temperature. I can use a large number of dehydrating catalysts, such as alkali metal hydroxides, alumina, alumina-silica, and the like. These catalysts may be used in any suitable form, for example, the alkali metal hydroxides may be fused or in aqueous solution or they may be adsorbed on a porous support; the alumina and the alumina-silica may be used in pellet form or as a very fine powder. As suitable dehydrating temperatures, I have found temperatures above the boiling point of water, preferably above about 150° C. and more desirably above about 175° C. To avoid excessive polymerization of the 2-vinyl-4-alkanolpyridine, it is desirable to remove it from the reaction zone and cool it as rapidly as possible.

The 2-ethanol-4-alkanolpyridines used in my present invention are new compounds. The process of preparing them is described in my co-pending application Serial No. 565,546, filed February 15, 1956.

My invention will be described more fully in conjunction with the following specific examples. It should be understood, however, that these examples are given by way of illustration only, and my invention is not to be limited by the details set forth therein. The parts are by weight.

EXAMPLE 1

*2-vinyl-4-(1-propan-3-ol)pyridine*

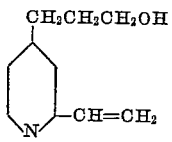

The polyalkanolpyridine, 2-(1-ethan-2-ol)-4-(1-propan-3-ol)pyridine, preferably dissolved in one to three parts of water, is desirably preheated to a temperature of about 100° C. and passed into liquid aqueous caustic soda, of about 50% to about 80% strength, maintained at a temperature of about 150° C. to about 250° C., but desirably at about 175° C., and being maintained under partial vacuum. The hot caustic soda vaporizes the solution of the polyalkanolpyridine and converts the polyalkanolpyridine into 2-vinyl-4-(1-propan-3-ol)pyridine. The vapors of the vinylpyridine, water, and any unchanged polyalkanolpyridine are condensed and collected in any suitable receiver.

The 2-vinyl-4-(1-propan-3-ol)pyridine is separated from the water and any unreacted 2-(ethan-2-ol)-4-(1-propan-3-ol)pyridine in any convenient manner. One way of separating the 2-vinyl-4-(1-propan-3-ol)pyridine is as follows: The aqueous reaction mixture is extracted with benzene, the 2-vinyl-4-(1-propan-3-ol)pyridines goes into the benzene phase and the polyalkanolpyridine stays in the aqueous phase. This benzene extraction is preferably conducted in a continuous manner utilizing an efficient counter-current extraction column. The 2-vinyl-4-(1-propan-3-ol)pyridine is separated from the benzene by distillation.

EXAMPLE 2

*2-vinyl-4-(1-propan-3-ol)-6-methylpyridine*

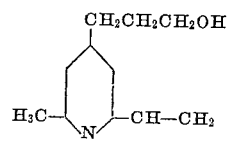

I vaporize 2-(1-ethan-2-ol-4-(1-propan-3-ol)-6-methylpyridine, mix it with water vapor, nitrogen, or carbon dioxide if desired and pass it through a suitable reactor containing an alumina-silica dehydrating catalyst, maintained under partial vacuum and at a temperature of from about 200° C. to about 400° C. As the 2-(1-ethan-2-ol)-4-(1-propan-3-ol)-6-methylpyridine passes through the reactor, it is decomposed into water and 2-vinyl-4-(1-propan-3-ol)-6-methylpyridine. The vapors of 2-vinyl-4-(1-propan-3-ol)-6-methylpyridine, water, any diluent gas if present, and any unchanged polyalkanolpyridine are promptly taken out of the reactor and are promptly condensed, cooled, and collected in any suitable receiver.

EAMPLE 3

The procedure of Example 2 is repeated except that I use 2-(1-ethan-2-ol)-4-(1-propan-3-ol)pyridine in place of 2-(1-ethan-2-ol)-4-(1-propan-3-ol) - 6 - methylpyridine and recover 2-vinyl-4-(1-propan-3-ol)pyridine.

EXAMPLE 4

The procedure of Example 1 is repeated except that I use 2 - (1-ethan-2-ol)-4-(1-propan-3-ol)-6-methylpyridine in place of 2-(1-ethan-2-ol)-4-(1-propan-3-ol)pyridine and I recover 2-vinyl-4-(1-propan-3-ol)-6-methylpyridine.

EXAMPLE 5

*2-vinyl-4-(1-2-methylpropan-3-ol)pyridine*

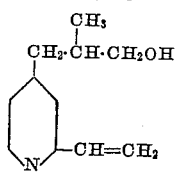

The procedure of Example 1 and of Example 2 is repeated except that I use 2-(1-ethan-2-ol)-4-(1-2-methylpropan-3-ol)pyridine in place of the 2-(1-ethan-2-ol)-4-(1-propan-3-ol)pyridine of Example 1 and the 2-(1-ethan-2-ol)-4-(1-propan-3-ol)-6-methylpyridine of Example 2.

The 2-vinyl-4-alkanolpyridines are useful in the preparation of polymers and co-polymers. They may be emulsion polymerized to give tough polymers having rubber-like elasticity when warm. The 2-vinyl-4-propanol-pyridine polymers may be portrayed as having the structure:

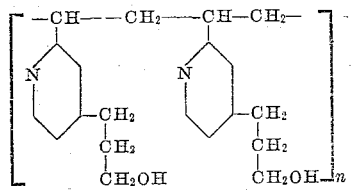

Illustrative of how my 2-vinyl-4-alkanolpyridines may be converted into polymers, I cite the following. The parts are by weight. Into a suitable reaction vessel provided with means for stirring and cooling, the following materials are charged:

| | Parts |
|---|---|
| 2-vinyl-4-(1-propan-3-ol)pyridine | 60 |
| Potassium persulfate | 0.6 |
| Sodium lauryl sulfate | 0.6 |
| Distilled water | 180 |

While stirring, the temperature was slowly raised to about 40° C. At this temperature, the polymerization was continued for about 18 hours. The white emulsion of polymer formed in this period of time was removed, coagulated, and filtered.

The presence of the primary alcohol groups in the resin matrix makes these polymers of interest as crosslinking agents in the preparation of polyesters and polyurethanes.

My 2-vinyl-4-alkanolpyridines may be used to make copolymers with acrylonitrile, styrene, butadiene, and other monomers. They may also be used to make interpolymers with many monomers. Thus, 2-vinyl-4-(1-propan-3-ol)pyridine may be reacted to form interpolymers with, e. g. 1) acrylonitrile and vinylacetate, 2) acrylonitrile and vinylchloride, and 3) 2-vinylpyridine, acrylonitrile, and vinyl chloride.

Thermal polymerization of 2-vinyl-4-(1-propan-3-ol)-pyridine proceeds, in the presence of a strong base, to give pyridylethylethers in accordance with U. S. Patent 2,667,491. The structure of these polymeric pyridylethyl ethers may be represented by the formula:

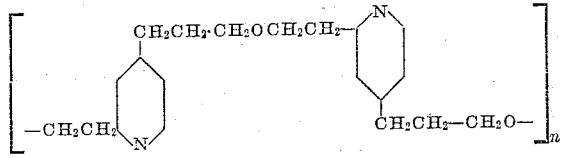

My vinylalkanolpyridines may be used for the preparation of linear polymer type alkyd resins having a number of vinylpyridyl groups in the resin molecule. Thus, the resin formed from glycerol, phthalic anhydride, and 2-vinyl-4-propanol-6-methylpyridine may be represented as having the structure:

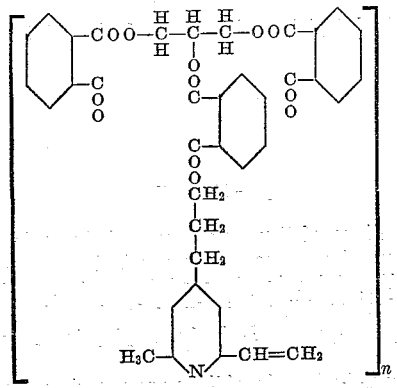

The presence of the vinylpyridine group in the resin molecule enables the resin to be reacted with liquid monomers, such as styrene, to yield insoluble and infusible resins. The presence of the pyridine ring nitrogen in the resin matrix imparts to these resins excellent adhesion to glass and to metals.

I claim as my invention:

1. The process of preparing 2-vinyl-4-alkanolpyridines having the general formula:

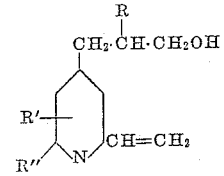

where R, R', and R'' is a member of the group consisting of hydrogen and lower alkyl, which comprises dehydrating a 2-ethanol-4-alkanolpyridine having the general formula:

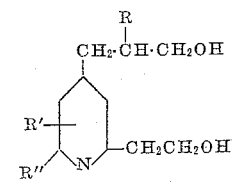

where R, R', and R''' is a member of the group consisting of hydrogen and lower alkyl.

2. The process of preparing the 2-vinyl-4-alkanolpyridines of claim 1 which comprises passing the 2-ethanol-4-alkanolpyridines of claim 1 through a non-acid dehydrating catalyst maintained at a dehydrating temperature.

3. The process of preparing 2-vinyl-4-(1-propan-3-ol)pyridine which comprises passing 2-(1-ethan-2-ol)-4-(1-propan-3-ol)pyridine through liquid caustic soda maintained at a temperature of from about 150° C. to about 250° C. and recovering the 2-vinyl-4-(1-propan-3-ol)-pyridine.

4. The process of preparing 2-vinyl-4-(1-propan-3-ol)pyridine which comprises vaporizing 2-(1-ethan-2-ol)-4-(1-propan-3-ol)pyridine, passing it through a reactor containing a non-acid dehydrating catalyst maintained at a temperature of from about 200° C. to about 400° C., removing the vapors from the reactor, condensing the vapors, and recovering 2-vinyl-4-(1-propan-3-ol)pyridine from the reaction mixture.

5. The process of preparing 2-vinyl-4-(1-propan-3-ol)-6-methylpyridine which comprises passing 2-(1-ethan-2-ol)-4-(1-propan-3-ol)-6-methylpyridine through liquid caustic soda maintained at a temperature of from about 150° C. to about 250° C. and recovering the 2-vinyl-4-(1-propan-3-ol)-6-methylpyridine.

6. The process of preparing 2-vinyl-4-(1-propan-3-ol)-6-methylpyridine which comprises vaporizing 2-(1-ethan-2-ol)-4-(1-propan-3-ol)-6-methylpyridine, passing it through a reactor containing a non-acid dehydrating catalyst maintained at a temperature of from about 200° C. to about 400° C., removing the vapors from the reactor, condensing the vapors, and recovering 2-vinyl-4-(1-propan-3-ol)-6-methylpyridine.

7. The process of preparing 2-vinyl-4-(1-2-methylpropan-3-ol)pyridine which comprises passing 2-(1-ethan-2-ol)-4-(1-2-methylpropan-3-ol)pyridine through liquid caustic soda maintained at a temperature of from about 150° C. to about 250° C. and recovering the 2-vinyl-4-(1-2-methylpropan-3-ol)pyridine.

8. The process of preparing 2-vinyl-4-(1-2-methylpropan-3-ol)pyridine which comprises vaporizing 2-(1-ethan-2-ol)-4-(1-2-methylpropan-3-ol)pyridine, passing it through a reactor containing a non-acid dehydrating catalyst maintained at a temperature of from about 200° C. to about 400° C., removing the vapors from the reactor, condensing the vapors, and recovering 2-vinyl-4-(1-2-methylpropan-3-ol)pyridine.
9. 2-vinyl-4-alkanolpyridines having the general formula:
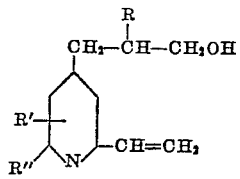
where R, R', and R'' is a member of the group consisting of hydrogen and lower alkyl.
10. The compound 2-vinyl-4-(1-propan-3-ol)pyridine.
11. The compound 2-vinyl-4-(1-propan-3-ol)-6-methylpyridine.
12. The compound 2-vinyl-4-(1-2-methylpropan-3-ol)pyridine.
No references cited.